(12) United States Patent
Okubo et al.

(10) Patent No.: US 8,116,926 B2
(45) Date of Patent: Feb. 14, 2012

(54) MOTOR POWER CONTROL

(75) Inventors: Carol Louise Okubo, Belleville, MI (US); Shunsuke Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 12/488,720

(22) Filed: Jun. 22, 2009

(65) Prior Publication Data

US 2010/0323844 A1 Dec. 23, 2010

(51) Int. Cl.
*B60K 1/00* (2006.01)
*G06F 19/00* (2006.01)

(52) U.S. Cl. ............ 701/22; 701/101; 180/65.3
(58) Field of Classification Search .......... 701/22, 701/101; 477/3; 180/65.3; 318/400.02, 318/490, 139
See application file for complete search history.

(56) References Cited

U.S. PATENT DOCUMENTS

| | | | |
|---|---|---|---|
| 7,219,757 B2 * | 5/2007 | Tomita et al. | 180/65.275 |
| 7,295,902 B2 | 11/2007 | Chen et al. | |
| 2005/0003927 A1 | 1/2005 | Asakawa et al. | |
| 2006/0021809 A1 * | 2/2006 | Xu et al. | 180/65.2 |
| 2007/0032926 A1 * | 2/2007 | Kozarekar et al. | 701/22 |
| 2009/0118883 A1 * | 5/2009 | Heap et al. | 701/22 |

OTHER PUBLICATIONS

Liang Chu et al., "Development and Validation of New Control Algorithm for Parallel Hybrid Electric Transit Bus", SAE Technical Paper Series 2006-01-3571, Commercial Vehicle Engineering Congress and Exhibition, Chicago, IL, Oct. 31-Nov. 2, 2006, 8 pages.

* cited by examiner

*Primary Examiner* — Tan Q Nguyen
(74) *Attorney, Agent, or Firm* — David B. Kelley; Brooks Kushman P.C.

(57) ABSTRACT

A hybrid electric vehicle includes an internal combustion engine, a traction battery, and a hybrid electric powertrain including an electric motor powered by the traction battery. A method of controlling the vehicle includes determining a desired motor torque, and calculating a desired total motor power based on the desired motor torque, current motor speed, and a loss map indicating motor losses as a function of motor torque and motor speed. The desired total motor power is limited to system limits based on traction battery charge and discharge power limits. A motor torque command which will achieve the limited total motor power is calculated. The motor is controlled based on the motor torque command.

20 Claims, 3 Drawing Sheets

MOTOR POWER CONTROL

BACKGROUND OF THE INVENTION

1. Field of the Invention

The invention relates to hybrid electric vehicles of the type including an internal combustion engine, a traction battery, and a hybrid electric powertrain. The invention further relates to controlling the powertrain such that battery power remains within the battery charge and discharge limits.

2. Background Art

In an existing hybrid electric vehicle, a hybrid electric vehicle powertrain includes a vehicle system controller (VSC), an internal combustion engine, a traction battery, and a transmission including a motor-generator subsystem. These components form a powersplit powertrain, and the VSC may control the components in an attempt to maximize fuel economy.

It is possible that, under some circumstances, the traction battery power may fall below a battery power charge limit or exceed a battery power discharge limit.

Background information may be found in U.S. Pat. No. 7,295,902 and U.S. Pub. No. 2005/0003927.

Further background information may be found in SAE Paper No. 2006-01-3571, October 2006, Liang Chu, Jilin University. Abstract: The new control algorithm for parallel hybrid electric vehicle is presented systematically, in which engine operation points are limited within higher efficient area by the control algorithm and the state of charge (SOC) is limited in a range in order to enhance the batteries' charging and discharging efficiency. In order to determine the ideal operating point of the vehicle's engine, the control strategy uses a lookup table to determine the torque output of the engine. The off-line simulation model of parallel HEV powertrain is developed which includes the control system and controlled objective (such as engine, electric motor, battery pack and so on). The results show that the control algorithm can effectively limit engine and battery operation points and much more fuel economy can be achieved than that of conventional one.

SUMMARY OF THE INVENTION

In one embodiment of the invention, a hybrid electric vehicle includes an internal combustion engine, a traction battery, and a hybrid electric powertrain including an electric motor powered by the traction battery. A method of controlling the vehicle includes determining a desired motor torque, and calculating a desired total motor power based on the desired motor torque, current motor speed, and a loss map indicating motor losses as a function of motor torque and motor speed. The desired total motor power is limited to system limits based on traction battery charge and discharge power limits. A motor torque command which will achieve the limited total motor power is calculated. The motor is controlled based on the motor torque command.

It is appreciated that determining the desired motor torque may take place in a variety of ways. One approach involves establishing a desired wheel torque, and determining a portion of the desired wheel torque provided by the internal combustion engine. The desired motor torque is determined based on the desired wheel torque and the portion of the desired wheel torque provided by the internal combustion engine.

It is appreciated that, at the more detailed level, embodiments of the invention comprehend a variety of additional features that may be implemented depending on the application. In one example of such a feature, calculating the motor torque command which will achieve the limited total motor power further comprises utilizing a map of total motor power as a function of motor torque at the current motor speed. The map of total motor power may calculate total motor power according to:

$$P_{mot\_total} = tq*spd + \mathrm{loss}(tq, spd)$$

wherein $P_{mot\_total}$ is the total motor power, tq is the motor torque, spd is the current motor speed, and loss(tq, spd) is the loss map indicating motor losses as a function of motor torque and motor speed. Further, an interpolation method may be utilized on the map of total motor power to determine the motor torque command.

It is appreciated that the system limits used to limit the desired total motor power may be calculated in a variety of ways. In one particular approach, electrical losses and accessory loads are estimated; and the system limits are calculated further based on the estimate of electrical losses and accessory loads. Estimating electrical losses and accessory loads may further comprise calculating an expected battery power, observing an actual battery power, comparing the expected battery power to the actual battery power to determine an error, and adjusting the estimate of electrical losses and accessory loads based on the error.

In another embodiment of the invention, a control unit for controlling a hybrid electric vehicle is provided. The hybrid electric vehicle includes an internal combustion engine, a traction battery, and a hybrid electric powertrain including an electric motor powered by the traction battery. The control unit is configured to: determine a desired motor torque; calculate a desired total motor power based on the desired motor torque, current motor speed, and a loss map indicating motor losses as a function of motor torque and motor speed; and limit the desired total motor power to system limits based on traction battery charge and discharge power limits. The control unit is further configured to: calculate a motor torque command which will achieve the limited total motor power, and control the motor based on the motor torque command.

It is appreciated that the control unit may further implement one or more of the additional features relating to motor power control that are comprehended by the invention.

DETAILED DESCRIPTION OF THE PREFERRED EMBODIMENT

Figure 1:
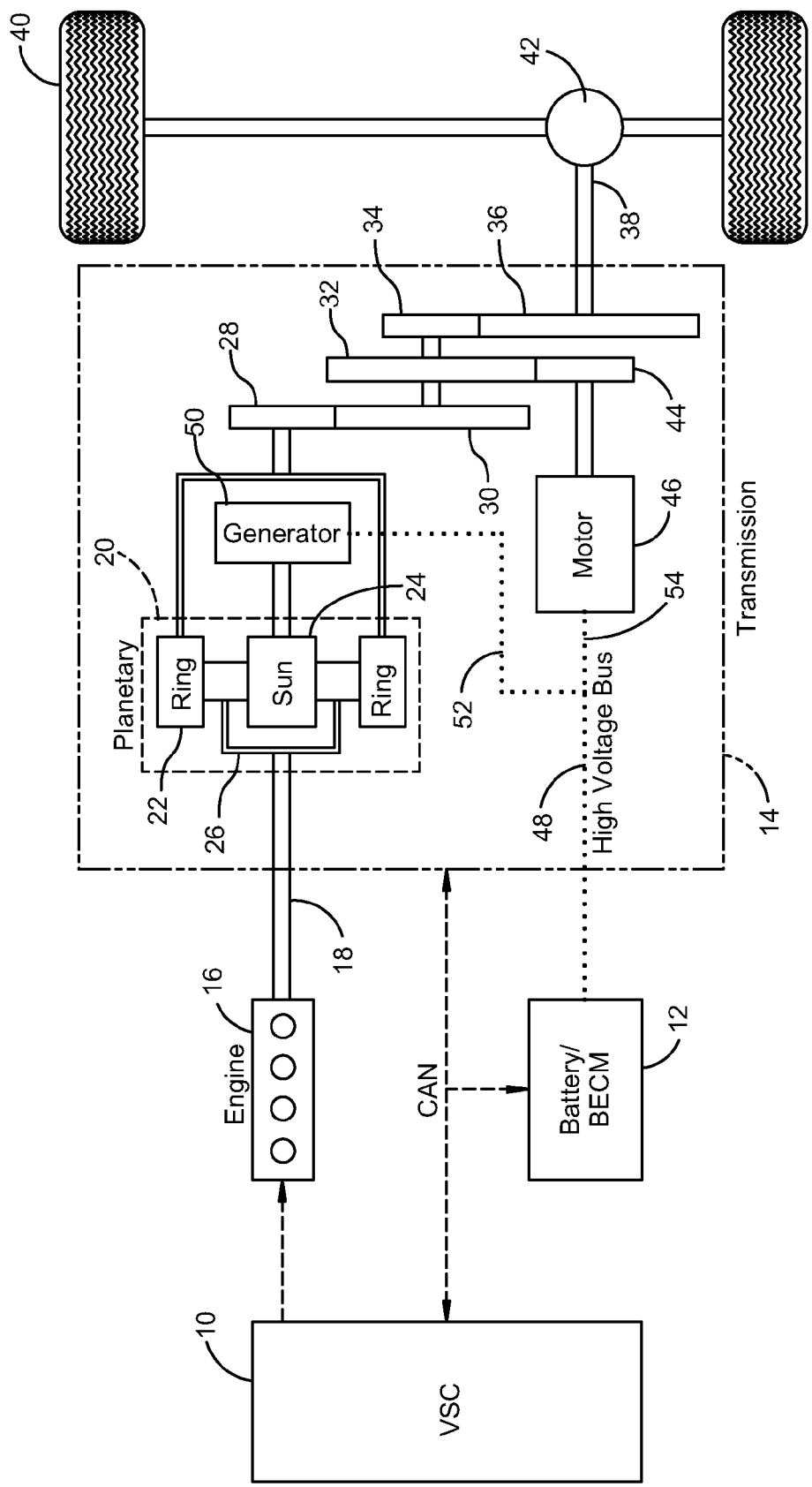
FIG. 1 is a schematic representation of a powersplit powertrain system configuration.

A hybrid electric vehicle powertrain is shown in FIG. 1. A vehicle system controller (VSC) 10, a battery and battery energy control module (BECM) 12, and a transmission 14, together with a motor-generator subsystem, comprise a control area network (CAN). An internal combustion engine 16, controlled by VSC 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission 14 is drivably connected to vehicle traction wheels 40 through a differential and axle mechanism 42.

Gears 30, 32, and 34 are mounted on a countershaft, with gear 32 engaging a motor-driven gear 44. Electric motor 46 drives gear 44, which acts as a torque input for the countershaft gearing.

The battery delivers electric power to the motor through power flow path 48, 54. Generator 50 is connected electrically to the battery and to the motor 46 in a known fashion as shown at 52.

The powersplit powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50, and the battery, where the battery acts as an energy storage medium for the generator 50 and the motor 46.

In general, VSC 10 calculates the total engine power needed to meet the drive wheel power demand plus all accessory loads, and independently schedules the engine speed and load operating point, with or without feedback of actual engine performance, to meet the total power demand. This type of approach is typically used to maximize fuel economy and may be used in other types of powertrain systems that have such VSCs.

Figure 2:
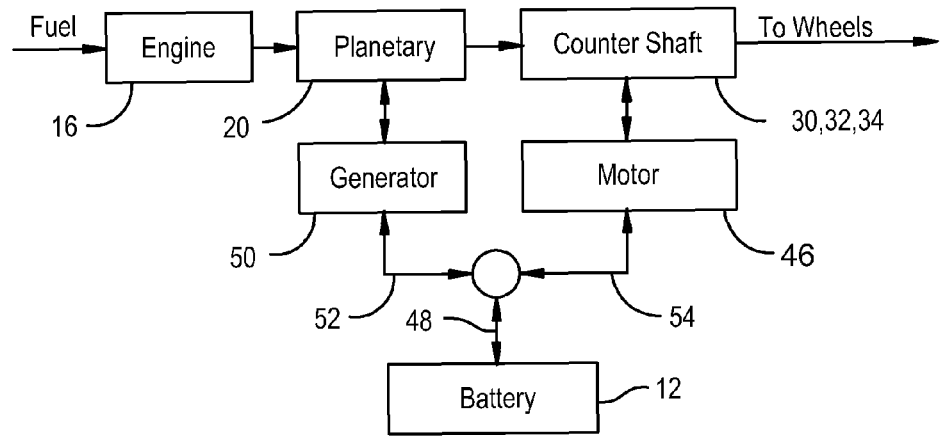
FIG. 2 is a schematic representation, in block diagram form, of a powertrain system power flow diagram.

The power flow paths between the various elements of the powersplit powertrain diagram shown in FIG. 1 are illustrated in FIG. 2. Fuel is delivered to the engine 16 under the control of the operator in a known fashion using an engine throttle. Engine 16 delivers power to the planetary gear unit 20. The available engine brake power is reduced by accessory loads. Power is delivered by the planetary ring gear to the countershaft gears 30, 32, 34. Power output from the transmission drives the wheels.

Generator 50, when acting as a motor, can deliver power to the planetary gearing. When acting as a generator, generator 50 is driven by the planetary gearing. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimum split of power between the two power sources.

Figure 3:
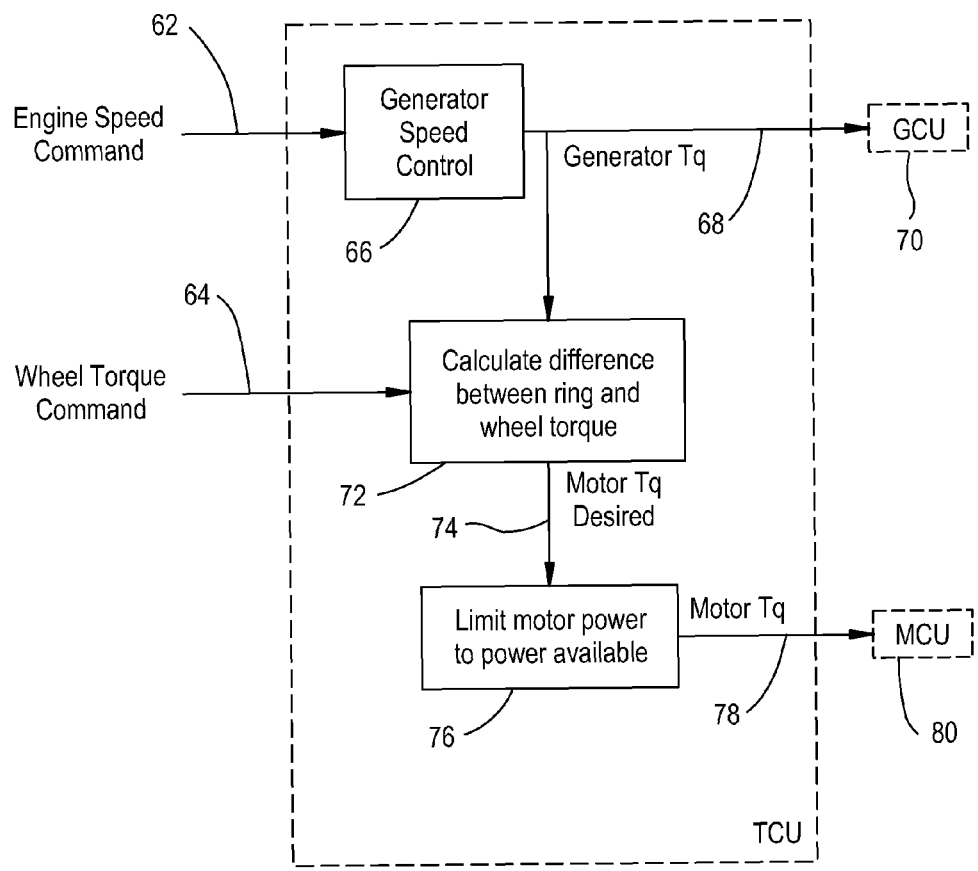
FIG. 3 is a schematic representation, in block diagram form, of a powertrain system control architecture including motor power control.

In the powersplit hybrid, the generator torque is used to control the engine speed to a commanded speed, and the motor torque is used to control the wheel torque to a commanded torque. A high-level block diagram of this control architecture is shown in FIG. 3. To control the powertrain such that battery power remains within the battery charge and discharge limits, battery power control is achieved by limiting the motor torque command such that the motor power does not exceed the available power, as shown in FIG. 3 which shows the addition of the motor power control to the transmission controller.

In more detail, transmission control unit 60 receives an engine speed command 62 and a wheel torque command 64. Generator speed control block 66 receives the engine speed command 62 and provides an appropriate generator torque command 68 to the generator control unit 70 in a known manner. Control block 72 receives the wheel torque command 64 and provides an appropriate desired motor torque 74 which is the calculated difference between the ring torque and wheel torque. To control the powertrain such that battery power remains within the battery charge and discharge limits, battery power control is achieved by limiting the motor torque command such that the motor power does not exceed the available power, at control block 76. Control block 76 receives the desired motor torque 74 as input and provides a motor torque command 78 to motor control unit 80. Control block 76 limits motor power to power available.

In the powersplit hybrid, battery power may easily be seen to be the sum of the power drawn by the motor 46, the power drawn by the generator 50, the electrical losses in the transmission 14 and the power drawn by any electrical accessories on the high voltage bus (such as electric A/C, and the DC-DC converter). Battery power may be described according to the following equation:

$$P_{batt} = (P_{gen} + P_{gen\_loss}) + (P_{mot} + P_{mot\_loss}) + P_{other} + P_{accessory}$$

wherein $P_{batt}$ is the battery power, $P_{gen}$ is the generator power, $P_{gen\_loss}$ is the generator losses, $P_{mot}$ is the motor power, $P_{mot\_loss}$ is the motor losses, $P_{other}$ is other losses in the motor-generator subsystem, and $P_{accessory}$ is the power drawn by any electrical accessories.

The generator power is predetermined, as the generator torque command results from a feedback control system which controls engine speed to a reference command. The losses and accessory powers are not directly controllable. Thus, battery power may be modified through manipulation of the motor torque command, which results in a modification of the delivered wheel torque.

Figure 4:
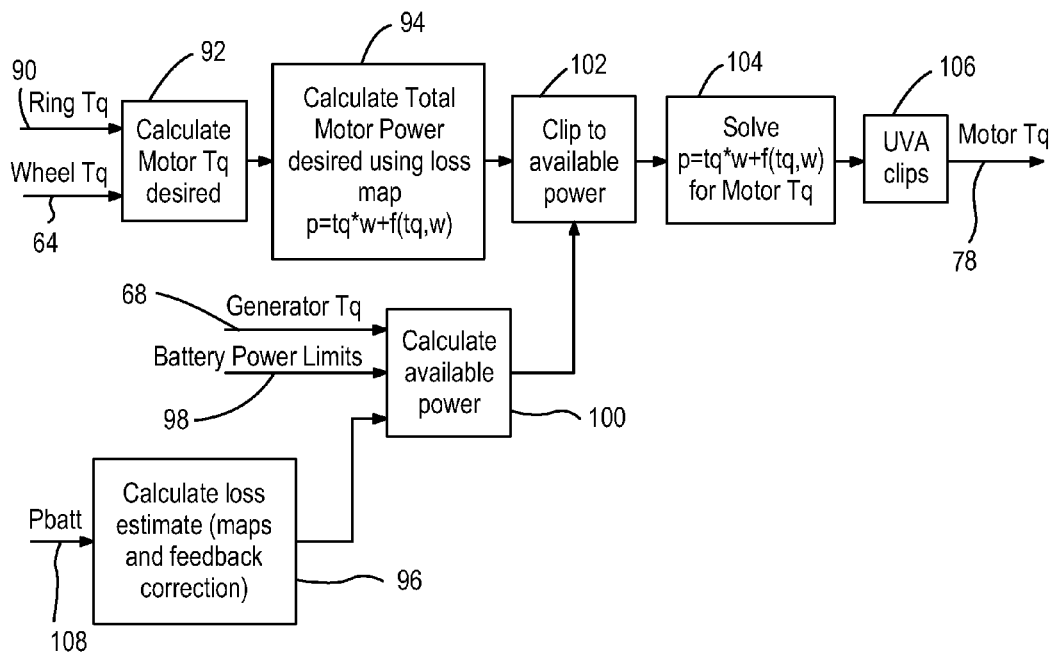
FIG. 4 is a schematic representation, in block diagram form, of motor power control.

With reference to FIG. 4, given the wheel torque command 64, the desired motor torque is calculated as the difference between the ring gear torque 90 and the desired wheel torque 64, at block 92. From this desired motor torque, a total desired motor power may be predicted using the motor speed, and a map of the motor losses as a function of motor torque, in addition to other variables such as motor speed and voltage, at block 94. Given the commanded generator torque 68, estimates of the electrical losses and accessory loads (block 96), and the allowable range for battery power 98, the total motor power must be bounded (block 100, calculate available power; block 102, clip to available power) as follows:

$$P_{mot\_total} = (P_{mot} + P_{mot\_loss}) < P_{batt\_discharge\_limit} - (P_{gen} + P_{gen\_loss}) - P_{other} - P_{accessory}$$

and $$P_{mot\_total} = (P_{mot} + P_{mot\_loss}) < P_{batt\_charge\_limit} - (P_{gen} + P_{gen\_loss}) - P_{other} - P_{accessory}$$

wherein $P_{mot\_total}$ is total motor power, $P_{mot}$ is motor power, $P_{mot\_loss}$ is motor losses, $P_{batt\_discharge\_limit}$ is the battery discharge power limit, $P_{gen}$ is the generator power, $P_{gen\_loss}$ is the generator losses, $P_{other}$ is other losses in the motor-generator subsystem, $P_{accessory}$ is the power drawn by any electrical accessories, and $P_{batt\_charge\_limit}$ is the battery charge power limit.

Once the motor power is bounded, it remains to determine a motor torque which achieves the desired total motor power, at block 104. Finally, the motor torque command is clipped by unintended vehicle acceleration (UVA) clips to ensure that the motor torque needed to solve the battery control problem does not cause excessive run-on, or other undesired vehicle behavior, at block 106.

Figure 5:
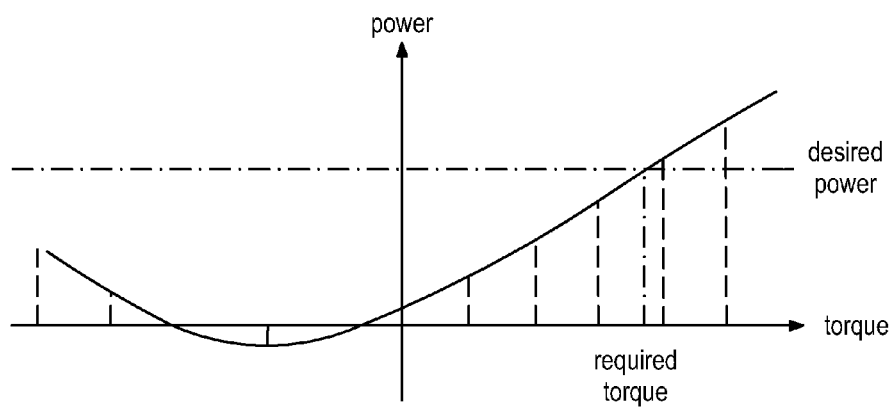
FIG. 5 is a graph illustrating a map of total motor power.

One method of solving for the motor torque at block 104 which achieves the desired total motor power is to create, at execution time, a 2-D map of total power versus motor torque at the current motor speed. A number of discrete motor torque "breakpoints" are selected (for convenience, these may be the same motor torque breakpoints used in the existing map of motor loss versus speed and torque), and for each torque the total motor power is calculated as:

$$P_{mot\_total} = tq * spd + \text{lookup on motor loss map}(tq, spd)$$

resulting in some curve, such as is shown in FIG. 5. At a fixed speed, the motor power (tq*spd) is linear and the motor losses are positive, non-linear and symmetric about zero torque, thus the resulting curve will have at most one minima.

The required torque is then found using an interpolation method. First, the table is searched to locate the minimum, if one exists, noting the minimum power and the torque at which it occurs. If the desired motor power is smaller than the minimum, no solution exists and the software selects the torque at which the minimum occurs. Otherwise, there are either one or two solutions. If the desired motor torque (that was calculated from the desired wheel torque and the ring gear torque, before the battery power control) is smaller than the torque at the minimum, then the software begins at the minimum and searches backwards through the power values to find the intercept, performing an interpolation to return the torque which achieves the desired power. Else, the software starts at the minimum and searches forward through the table to interpolate and return the required torque.

Up to this point, the discussion of the motor power control has included only feedforward controls, which calculate a motor torque which will keep the battery power within its allowable range. This feedforward control will be exact if all of the loss maps and accessory loads are known precisely. Since this is not likely to be the case, a correction is applied to the loss estimate (block 96, FIG. 4) based on feedback 108 (FIG. 4) from the battery. Using the loss maps and accessory load estimates, and the commanded motor and generator torque, an expected battery power may be calculated as follows:

$$P_{batt\_expected} = (P_{gen} + P_{gen\_loss}) + (P_{mot} + P_{mot\_loss}) + P_{other} + P_{accessory}$$

wherein $P_{batt\_expected}$ is the expected battery power, $P_{gen}$ is the generator power, $P_{gen\_loss}$ is the generator losses, $P_{mot}$ is the motor power, $P_{mot\_loss}$ is the motor losses, $P_{other}$ is other losses in the motor-generator subsystem, and $P_{accessory}$ is the power drawn by any electrical accessories.

The expected battery power may be compared with the observed battery power, and any error between the two may be corrected out of the system using a PI controller which adjusts the total loss estimate.

Embodiments of the invention may have many advantages. For example, embodiments of the invention predict the effect of wheel torque modifications on the motor losses. This is most significant around zero vehicle speed where the losses exceed the actual motor power. In another advantage, embodiments of the invention may utilize a non-linear motor torque to total motor power map.

While the best mode for carrying out the invention has been described in detail, those familiar with the art to which this invention relates will recognize various alternative designs and embodiments for practicing the invention as defined by the following claims.

What is claimed:

1. A method of controlling a hybrid electric vehicle including an internal combustion engine, a traction battery, and a hybrid electric powertrain including an electric motor powered by the traction battery, the method comprising:
   determining a desired motor torque;
   calculating a desired total motor power based on the desired motor torque, current motor speed, and a loss map indicating motor losses as a function of motor torque and motor speed;
   limiting the desired total motor power to system limits based on traction battery charge and discharge power limits;
   calculating a motor torque command which will achieve the limited total motor power; and
   controlling the motor based on the motor torque command.

2. The method of claim 1 wherein determining the desired motor torque further comprises:
   establishing a desired wheel torque;
   determining a portion of the desired wheel torque provided by the internal combustion engine; and
   determining the desired motor torque based on the desired wheel torque and the portion of the desired wheel torque provided by the internal combustion engine.

3. The method of claim 1 wherein calculating the motor torque command which will achieve the limited total motor power further comprises:
   utilizing a map of total motor power as a function of motor torque at the current motor speed.

4. The method of claim 3 wherein the map of total motor power calculates total motor power according to:

$$P_{mot\_total} = tq * spd + \text{loss}(tq, spd)$$

wherein $P_{mot\_total}$ is the total motor power, tq is the motor torque, spd is the current motor speed, and loss(tq, spd) is the loss map indicating motor losses as a function of motor torque and motor speed.

5. The method of claim 4 further comprising:
   utilizing an interpolation method on the map of total motor power to determine the motor torque command.

6. The method of claim 1 wherein limiting the desired total motor power to system limits based on traction battery charge and discharge power limits further comprises:
   estimating electrical losses and accessory loads; and
   calculating the system limits further based on the estimate of electrical losses and accessory loads.

7. The method of claim 6 wherein estimating electrical losses and accessory loads further comprises:
   calculating an expected battery power;
   observing an actual battery power;
   comparing the expected battery power to the actual battery power to determine an error; and
   adjusting the estimate of electrical losses and accessory loads based on the error.

8. A method of controlling a hybrid electric vehicle including an internal combustion engine, a traction battery, and a hybrid electric powertrain including an electric motor powered by the traction battery, the method comprising:
   establishing a desired wheel torque;
   determining a portion of the desired wheel torque provided by the internal combustion engine;
   determining a desired motor torque based on the desired wheel torque and the portion of the desired wheel torque provided by the internal combustion engine;
   calculating a desired total motor power based on the desired motor torque, current motor speed, and a loss map indicating motor losses as a function of motor torque and motor speed;
   estimating electrical losses and accessory loads;

calculating system limits based on traction battery charge and discharge power limits, and the estimate of electrical losses and accessory loads;

limiting the desired total motor power to the system limits;

calculating a motor torque command which will achieve the limited total motor power; and controlling the motor based on the motor torque command.

9. The method of claim 8 wherein calculating the motor torque command which will achieve the limited total motor power further comprises:

utilizing a map of total motor power as a function of motor torque at the current motor speed.

10. The method of claim 9 wherein the map of total motor power calculates total motor power according to:

$$P_{mot\_total}=tq*spd+\text{loss}(tq,spd)$$

wherein $P_{mot\_total}$ is the total motor power, tq is the motor torque, spd is the current motor speed, and loss(tq, spd) is the loss map indicating motor losses as a function of motor torque and motor speed.

11. The method of claim 10 further comprising:

utilizing an interpolation method on the map of total motor power to determine the motor torque command.

12. The method of claim 8 wherein estimating electrical losses and accessory loads further comprises:

calculating an expected battery power;

observing an actual battery power;

comparing the expected battery power to the actual battery power to determine an error; and adjusting the estimate of electrical losses and accessory loads based on the error.

13. A control unit for controlling a hybrid electric vehicle including an internal combustion engine, a traction battery, and a hybrid electric powertrain including an electric motor powered by the traction battery, the control unit being configured to:

determine a desired motor torque;

calculate a desired total motor power based on the desired motor torque, current motor speed, and a loss map indicating motor losses as a function of motor torque and motor speed;

limit the desired total motor power to system limits based on traction battery charge and discharge power limits;

calculate a motor torque command which will achieve the limited total motor power; and control the motor based on the motor torque command.

14. The control unit of claim 13 wherein determining the desired motor torque further comprises:

establishing a desired wheel torque;

determining a portion of the desired wheel torque provided by the internal combustion engine; and determining the desired motor torque based on the desired wheel torque and the portion of the desired wheel torque provided by the internal combustion engine.

15. The control unit of claim 13 wherein calculating the motor torque command which will achieve the limited total motor power further comprises:

utilizing a map of total motor power as a function of motor torque at the current motor speed.

16. The control unit of claim 15 wherein the map of total motor power calculates total motor power according to:

$$P_{mot\_total}=tq*spd+\text{loss}(tq,spd)$$

wherein $P_{mot\_total}$ is the total motor power, tq is the motor torque, spd is the current motor speed, and loss(tq, spd) is the loss map indicating motor losses as a function of motor torque and motor speed.

17. The control unit of claim 16 wherein the control unit is further configured to:

utilize an interpolation method on the map of total motor power to determine the motor torque command.

18. The control unit of claim 13 wherein limiting the desired total motor power to system limits based on traction battery charge and discharge power limits further comprises:

estimating electrical losses and accessory loads; and calculating the system limits further based on the estimate of electrical losses and accessory loads.

19. The control unit of claim 18 wherein estimating electrical losses and accessory loads further comprises:

calculating an expected battery power;

observing an actual battery power;

comparing the expected battery power to the actual battery power to determine an error; and adjusting the estimate of electrical losses and accessory loads based on the error.

20. The control unit of claim 13 wherein determining the desired motor torque further comprises:

establishing a desired wheel torque;

determining a portion of the desired wheel torque provided by the internal combustion engine; and determining the desired motor torque based on the desired wheel torque and the portion of the desired wheel torque provided by the internal combustion engine; and wherein limiting the desired total motor power to system limits based on traction battery charge and discharge power limits further comprises:

estimating electrical losses and accessory loads; and calculating the system limits further based on the estimate of electrical losses and accessory loads.

* * * * *